US012665528B2

(12) United States Patent
Wei et al.

(10) Patent No.: US 12,665,528 B2
(45) Date of Patent: Jun. 23, 2026

(54) STARTUP CONTROL CIRCUIT, POWER TOOL, AND STARTUP CONTROL METHOD THEREOF

(71) Applicant: Greenworks (Jiangsu) Co., Ltd, Changzhou (CN)

(72) Inventors: Zefeng Wei, Changzhou (CN); Biao Li, Changzhou (CN)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 0 days.

(21) Appl. No.: 19/001,548

(22) Filed: Dec. 25, 2024

(65) Prior Publication Data

US 2025/0219555 A1 Jul. 3, 2025

(30) Foreign Application Priority Data

Dec. 29, 2023 (CN) .......................... 202311861721.7
Dec. 29, 2023 (CN) .......................... 202323666567.6

(51) Int. Cl.
| | |
|---|---|
| *H02P 1/18* | (2006.01) |
| *F16P 3/00* | (2006.01) |
| *H01M 50/247* | (2021.01) |
| *H01M 50/574* | (2021.01) |

(52) U.S. Cl.
CPC ................ *H02P 1/18* (2013.01); *F16P 3/003* (2013.01); *H01M 50/247* (2021.01); *H01M 50/574* (2021.01); *H01M 2220/30* (2013.01)

(58) Field of Classification Search
CPC ......... H02P 1/18; F16P 3/003; H01M 50/247; H01M 50/574; H01M 2220/30; H02J 7/855; H02J 7/667; H02J 2207/10; H02J 2207/20
See application file for complete search history.

(56) References Cited

U.S. PATENT DOCUMENTS

2013/0009466 A1 1/2013 Kumagai

FOREIGN PATENT DOCUMENTS

| CN | 112952759 A | 6/2021 |
|---|---|---|
| EP | 3150338 A1 | 4/2017 |
| EP | 3836345 A1 | 6/2021 |

OTHER PUBLICATIONS

Extended European Search Report of Counterpart European Patent Application No. 24221718.0 issued on Jul. 4, 2025.

*Primary Examiner* — Daniel Cavallari

(57) ABSTRACT

A startup control circuit includes a direct current (DC) conversion circuit, a main control unit, a first switch circuit and a second switch circuit. The first switch circuit is connected to the battery pack and the DC conversion circuit. The second switch circuit is connected to a battery pack, the DC conversion circuit, and a main control unit. The first switch circuit is configured to activate the DC conversion circuit to supply power to the second switch circuit and the main control unit after the first switch circuit is triggered. The second switch circuit outputs different voltage waveforms based on different timing sequences of currents flowing from the battery pack and the DC conversion circuit to the second switch circuit. The main control unit is configured to output a first drive command when receiving a first voltage waveform.

16 Claims, 6 Drawing Sheets

1

STARTUP CONTROL CIRCUIT, POWER TOOL, AND STARTUP CONTROL METHOD THEREOF

CROSS REFERENCE TO RELATED APPLICATION

The present application claims the priority of the following Chinese patent applications: serial No. CN202311861721.7, filed on Dec. 29, 2023, CN202323666567.6, filed on Dec. 29, 2023; the disclosure of which is hereby incorporated by reference herein in its entirety for all purposes.

FIELD

The present invention is related to a startup control circuit, a power tool and a control method thereof, and more particularly related to a startup control circuit, a power tool and a control method thereof for a achieving a safety and effective control.

BACKGROUND

The advancement of technology has transformed many aspects of daily life, including how people maintain their gardens. Gardening, once a predominantly manual activity, has embraced tools that simplify and enhance the efficiency of various tasks. These tools are now a part of the routines of both homeowners and professional workers, catering to diverse needs in garden care and maintenance.

Tasks such as lawn maintenance, leaf collection, and cleaning debris have become significantly easier with the introduction of modern gardening tools. For example, tools designed to handle overgrown grass, remove fallen leaves, and clean trash from garden paths are increasingly common. They save time and effort, enabling even novice gardeners to achieve tidy and well-maintained outdoor spaces.

Water management, another essential aspect of gardening, has also benefited from technology. Tools such as automated watering systems and portable pumps ensure that plants receive the right amount of water efficiently. These innovations help minimize manual labor while contributing to the health of gardens, regardless of their size or complexity.

One of the key advancements in these tools is the shift toward battery-powered designs. Unlike traditional tools that depend on electrical outlets, battery-powered options offer unparalleled mobility and convenience. They allow users to work in remote areas of their gardens without the need for cumbersome cords or access to power outlets, making them especially useful for large properties or areas with limited infrastructure.

However, the reliance on battery technology introduces certain safety and environmental concerns. Batteries, if not properly managed, can pose risks such as overheating, short circuits, or improper disposal. While they enhance convenience, they also require users to be mindful of safe charging practices and environmentally friendly disposal methods to mitigate potential hazards.

Professional gardeners often rely on specialized tools that maximize productivity and ensure precision. Battery-powered hedge trimmers, chainsaws, and soil tillers are examples of equipment designed to handle demanding tasks efficiently. These tools enable professionals to maintain expansive gardens or manage projects that would be challenging with manual tools alone.

For homeowners, battery-powered gardening tools provide an opportunity to take on more tasks independently. They make activities like trimming hedges, mowing lawns, and clearing pathways more accessible to those without professional expertise. This democratization of garden maintenance has encouraged many people to engage more actively in caring for their outdoor spaces.

Despite their advantages, these tools do require regular maintenance and proper handling to ensure durability and safety. Users must remain vigilant about battery life, charging cycles, and safe operation to prevent accidents or damage. Awareness of these aspects is crucial for fully enjoying the benefits that technology brings to gardening.

Ultimately, the rise of modern gardening tools reflects a broader trend in how technology integrates into everyday activities. By combining innovation with practicality, these tools not only make gardening more efficient but also encourage more people to participate in maintaining their green spaces. This blend of traditional practices with modern technology underscores the evolving relationship between people and their gardens.

While battery-powered tools continue to shape the future of gardening, they remind us of the balance between convenience and responsibility. As technology progresses, striking this balance will remain essential for sustainable and enjoyable gardening practices.

Electric tools have numerous advantages over traditional manual tools, offering significant improvements in efficiency, quality, and safety. This has made them increasingly popular among both professionals and casual users. For example, an electric chainsaw is a sophisticated device composed of four main components: a motor that provides power, a battery pack for energy, a circuit board for drive control, and a saw chain for performing the cutting action.

While electric chainsaws are highly efficient, they can pose safety risks if not operated correctly. If an operator uses one hand to press the trigger and then inserts the battery pack with the other, the motor might engage the saw chain immediately upon battery insertion. This improper operation can lead to serious injuries and property damage, highlighting the safety concerns associated with these tools.

Given these risks, there is an urgent need to develop advanced start control circuits for electric tools such as chainsaws. These circuits could prevent the unintended activation of the saw chain or other operational units when the battery pack is inserted incorrectly. Such advancements would greatly enhance user safety during tool operation.

By addressing these issues, manufacturers can ensure that electric tools remain reliable and secure for their users. The development of preventive mechanisms and smarter control systems is crucial to mitigating the dangers posed by improper handling or accidental activation.

The continued improvement of electric tools underscores the balance between leveraging technological innovation and ensuring user safety. As these tools become more prevalent in various fields, their design must evolve to meet higher safety standards, offering both efficiency and peace of mind to operators.

SUMMARY

In some embodiments, a startup control circuit is designed to enhance the safety and functionality of power tools. It includes essential components such as a direct current (DC) conversion circuit, a main control unit, a first switch circuit and a second switch circuit. These components work together to regulate power flow and control tool operations.

For example, the first switch circuit activates the DC conversion circuit, which then supplies power to the second switch circuit and the main control unit, ensuring a controlled startup process.

The second switch circuit plays a critical role by outputting different voltage waveforms based on the timing of current flows. These waveforms signal the main control unit to issue specific drive commands. For instance, when the second switch circuit first receives current from the DC conversion circuit, it generates a first voltage waveform, prompting the main control unit to issue a first drive command. This mechanism ensures precise control over tool activation, reducing the risk of unintended operation.

The first switch circuit itself includes components such as a startup switch, a voltage dividing circuit, and a control switch. These components ensure that when the startup switch is closed and the battery pack is inserted, the control switch activates the DC conversion circuit, initiating the tool's operation. Additional safety measures, like a voltage regulator tube and a first protection diode, are included to stabilize the voltage and protect against electrical surges, further ensuring reliable performance.

The second switch circuit includes parts like a capacitor and an optocoupler, which manage the timing of current flows. For example, when currents from the battery pack and the DC conversion circuit arrive simultaneously, the second switch circuit outputs a specific voltage waveform. Conversely, if one current arrives earlier, it outputs a different waveform. These distinct waveforms guide the main control unit in determining whether the tool should remain inactive or begin operation, adding a layer of safety and precision.

In some configurations, a relay is incorporated into the apparatus. This relay, powered by the DC conversion circuit, connects the battery pack to the drive unit, further controlling the flow of power. Additionally, a battery pack emergency warning circuit may be included to monitor temperature abnormalities. If an issue is detected, a backup battery can send an emergency alert to the user's device, ensuring quick response to potential hazards.

For enhanced safety, user devices can interact with the startup control circuit to send commands or disconnect the battery pack in emergencies. Biometric authentication may also be employed to prevent accidental activation of control commands, adding a modern and secure dimension to tool management. These features highlight the apparatus's focus on combining convenience with safety.

In some embodiments, the startup control circuit is integrated into power tools like chainsaws, pruners, and grass trimmers. The apparatus ensures that the tools operate only under specific conditions. For example, the drive unit, which controls the action part, responds to commands from the main control unit based on detected voltage waveforms, ensuring the tool's operation aligns with safe practices.

The method of operation emphasizes timing and path differentiation of current flow. When the current from the battery pack takes distinct paths to reach the second switch circuit, the timing differences produce specific waveforms. These waveforms guide the main control unit in determining whether to activate or restrict the tool's action part. This precise control ensures user safety and prevents accidental tool activation.

Overall, the startup control circuit exemplifies the integration of advanced control systems in power tools. By combining components like switch circuits, DC conversion circuits, and emergency mechanisms, it addresses the need for safer and more reliable operation. This approach reflects a commitment to innovation and user safety, making power tools more accessible and secure for diverse applications.

In some embodiments, the integration of a DC conversion circuit and switch circuits creates a highly controlled startup process for power tools. The DC conversion circuit converts power from the battery pack into a form suitable for the operation of other components. The first and second switch circuits then work in tandem to regulate the flow of current, ensuring that the power tool activates only under safe and intended conditions. For instance, the first switch circuit triggers the DC conversion circuit, while the second switch circuit processes the timing of current flow to generate appropriate voltage waveforms for the main control unit.

The second switch circuit's reliance on timing differences between current paths demonstrates its sophisticated design. The use of components like capacitors and optocouplers allows it to detect whether currents from the battery pack and DC conversion circuit arrive simultaneously or at different times. This distinction is critical, as it determines whether the tool remains inactive or begins operation. Such a system prevents unintended startups, especially during battery insertion or improper handling.

The inclusion of additional safety components, like voltage regulator tubes and protection diodes, ensures that the apparatus can handle fluctuations in voltage and current. These components protect the circuitry from electrical surges or short circuits, enhancing the durability and reliability of the tool. The apparatus also integrates backup power systems, such as relays and emergency circuits, to maintain functionality and provide alerts during abnormal situations.

For example, the emergency warning circuit can detect overheating in the battery pack and immediately notify the user through a backup battery-powered system. In extreme cases, the apparatus can disconnect the battery pack or even physically shield it to prevent further damage. This multilayered approach to safety reflects the apparatus's commitment to addressing both user convenience and operational risks.

Biometric authentication adds a modern layer of security, ensuring that only authorized users can control the apparatus. This feature is particularly useful in environments where tools may be shared or accessed by multiple individuals. By requiring fingerprint or facial recognition, the system prevents accidental or unauthorized activation of commands, aligning with the broader trend of integrating advanced technologies into everyday tools.

The versatility of the startup control circuit is evident in its compatibility with various power tools, such as chainsaws, pruners, and trimmers. Each of these tools benefits from the precise control offered by the apparatus, which ensures safe operation regardless of the tool type. For instance, a chainsaw equipped with this system can only start its motor after verifying specific voltage waveforms, reducing the risk of accidents caused by improper handling.

The emphasis on timing and current flow paths also illustrates the apparatus's innovative approach to tool safety. By differentiating between the arrival times of currents through distinct paths, the system creates unique voltage waveforms that guide the tool's main control unit. This mechanism not only prevents accidental startups but also enhances user confidence in the tool's reliability.

The integration of relays and control circuits further highlights the apparatus's advanced design. Relays serve as critical intermediaries that connect or disconnect power to the tool's drive unit, while control circuits monitor the system's overall health. Together, these components ensure that the tool operates efficiently and safely, meeting the demands of both professional and casual users.

Overall, the startup control circuit represents a significant advancement in power tool technology. Its combination of safety, precision, and convenience underscores the importance of innovation in tool design. As power tools become increasingly essential in various applications, such systems play a vital role in ensuring they remain user-friendly and secure.

The startup control circuit also emphasizes the adaptability of power tools to diverse operating environments. By incorporating a combination of circuits, switches, and safety mechanisms, it ensures that the tool can function reliably even in challenging conditions. For example, the presence of protection diodes safeguards the internal components from potential electrical malfunctions, such as reverse current flow or voltage spikes, which are more likely in outdoor or high-demand scenarios.

The reliance on timing-based voltage waveforms for control commands introduces a level of precision not commonly found in conventional power tools. This innovation ensures that tools are activated only under specific, deliberate circumstances. Such a feature is particularly beneficial for tasks requiring meticulous operation, such as pruning delicate plants or shaping hedges, where accidental activation could cause damage or injury.

In applications like chainsaws or reciprocating saws, the startup control circuit plays an even more critical role. These tools inherently carry higher risks due to their cutting mechanisms and powerful motors. By integrating the apparatus, these tools benefit from controlled startups, ensuring the motor and action part do not engage without the correct sequence of operations. This precaution significantly reduces the likelihood of accidental injuries, especially in environments where users may frequently change battery packs.

The addition of emergency response features, such as backup batteries and warning systems, further elevates the apparatus's utility. For instance, in scenarios where the battery pack overheats or malfunctions, the apparatus can disconnect the power source and alert the user to the issue. This proactive approach prevents damage to the tool and reduces the risk of injury, showcasing a forward-thinking design that prioritizes user safety.

User devices connected to the apparatus offer enhanced control and monitoring capabilities. Through wireless communication, such as Bluetooth or Wi-Fi, these devices can relay vital information about the tool's status or receive real-time alerts. They can also execute specific commands, such as emergency power disconnection, adding a layer of remote accessibility that is invaluable in professional or large-scale operations.

The startup control circuit's method of distinguishing current paths through the DC conversion circuit and the battery pack exemplifies its innovative engineering. By carefully monitoring the flow of current and generating appropriate voltage waveforms, the apparatus ensures precise coordination between its components. This level of control makes it suitable for both heavy-duty applications and delicate tasks, broadening its appeal across various user groups.

Biometric authentication integrated into the system further enhances its usability and security. By requiring the user to authenticate their identity before issuing critical commands, the apparatus prevents misuse or accidental activation. This feature is especially valuable for tools used in shared or industrial settings, where unauthorized access could lead to safety hazards or operational disruptions.

The startup control circuit also reflects broader trends in technological integration, as it merges traditional mechanical systems with advanced electronic controls. This synthesis creates a new standard for power tools, where safety and performance are prioritized alongside user convenience. The apparatus's ability to adapt to various tools, from lawn care equipment to construction tools, demonstrates its versatility and widespread applicability.

In conclusion, the startup control circuit represents a significant leap forward in the design and functionality of power tools. Its combination of precision control, advanced safety mechanisms, and user-centric features makes it a vital addition to modern tools. By addressing both operational efficiency and potential risks, the apparatus sets a new benchmark for safety and innovation in the power tool industry.

The startup control circuit is also notable for its efficient use of energy and seamless integration of components. The inclusion of a DC conversion circuit ensures that power is supplied to various components in a stable and regulated manner. This regulation is particularly important for tools that require consistent power delivery to maintain performance, such as grass trimmers or reciprocating saws. Stable power flow prevents fluctuations that could otherwise lead to tool malfunction or reduced efficiency.

The second switch circuit's design, incorporating capacitors and optocouplers, exemplifies how advanced electronics enhance the safety and reliability of power tools. Optocouplers, for instance, are components that use light to transfer electrical signals, providing isolation between different sections of the circuit. This feature is critical in reducing the risk of electrical interference and ensuring the precise timing needed for generating the first and second voltage waveforms. By implementing such technologies, the apparatus enhances not only the tool's safety but also its operational lifespan.

Another key aspect of the apparatus is its ability to handle different voltage waveforms, which correspond to various tool states. For example, the first voltage waveform-changing from low to high-indicates a controlled startup, while the second waveform-changing from high to flat-signals readiness for full operation. These distinctions allow the main control unit to execute commands with precision, ensuring that the tool functions as intended under all conditions.

The inclusion of relays further underscores the apparatus's commitment to operational reliability. Relays act as switches that can open or close circuits electronically or electromechanically, enabling precise control of power distribution. In this apparatus, the relay connects the battery pack to the drive unit only when specific conditions are met, reducing the risk of unintended tool activation. This feature is particularly valuable for high-power tools, where accidental activation could have severe consequences.

The emergency warning circuit and its integration with backup battery systems highlight the apparatus's proactive approach to user safety. For instance, if abnormal temperature levels are detected in the battery pack, the circuit not only alerts the user but also takes preemptive actions such as disconnecting the battery pack or shielding it with a physical structure. These measures protect both the user and the tool from potential damage, demonstrating the apparatus's comprehensive safety design.

Moreover, the use of biometric authentication to control critical functions ensures that only authorized personnel can access the tool's advanced features. This is especially beneficial in professional environments, where multiple users may handle the same equipment. By requiring biometric validation, the apparatus minimizes risks associated with unauthorized use or accidental activation, setting a higher standard for tool security.

The startup control circuit's versatility extends to its compatibility with various power tools, ranging from lightweight household tools to heavy-duty industrial equipment. Whether used in a garden trimmer or a chainsaw, the apparatus ensures that each tool operates safely and efficiently. Its adaptability to different tools and tasks reflects a forward-thinking design that caters to a wide range of users, from homeowners to professionals.

Finally, the overall integration of components, including the first and second switch circuits, the DC conversion circuit, and the main control unit, ensures seamless operation and coordination. Each part of the apparatus works in harmony, guided by precise timing and current flow management. This level of integration not only enhances the tool's performance but also simplifies its maintenance, making it a practical choice for long-term use.

In summary, the startup control circuit combines cutting-edge technology with practical safety measures to redefine the operation of power tools. Its innovative features, from voltage waveform control to emergency response systems, provide a comprehensive solution for enhancing both safety and efficiency. This apparatus stands as a testament to how modern engineering can transform traditional tools, making them more reliable, user-friendly, and secure for all applications.

The startup control circuit also incorporates thoughtful design parts to address user convenience during everyday operation. For example, the apparatus's ability to distinguish between the first and second current paths ensures a precise response to different startup scenarios. This feature is particularly useful in environments where tools are frequently powered on and off, as it prevents wear and tear caused by abrupt or improper activation.

The inclusion of protection diodes, such as the first and second protection diodes, further enhances the durability of the apparatus. These diodes protect the circuits by allowing current to flow in a single direction, preventing potential damage caused by reverse current or electrical surges. This design not only safeguards the tool's internal components but also extends the lifespan of the device, making it a more reliable choice for long-term use.

Additionally, the apparatus's compatibility with a wide range of tools demonstrates its versatility. Whether used in pruning, trimming, or heavy-duty cutting, the apparatus ensures that each tool benefits from its advanced startup control and safety mechanisms. This adaptability highlights its potential as a universal solution for modern power tools, reducing the need for multiple, tool-specific systems.

The emphasis on controlled startup extends to the apparatus's integration with drive units and action parts. By regulating the flow of current and monitoring voltage waveforms, the apparatus ensures that the action part is only activated under safe conditions. For instance, when the first voltage waveform is detected, the drive unit keeps the action part inactive, while the second waveform allows full operation. This level of control significantly reduces the risk of accidents during tool use.

The startup control method further refines the apparatus's functionality by defining specific paths and timing sequences for current flow. These sequences ensure that the tool's components work in harmony, preventing conflicts or delays in operation. This method also supports the seamless integration of additional features, such as relays and emergency circuits, enhancing the overall reliability and safety of the tool.

Moreover, the apparatus's ability to detect and respond to abnormal conditions, such as battery overheating, underscores its focus on proactive safety measures. By using backup battery systems to send alerts or take protective actions, the apparatus minimizes risks associated with battery failure. This feature is particularly valuable for tools used in demanding environments, where uninterrupted operation and user safety are paramount.

In conclusion, the startup control circuit represents a significant innovation in power tool technology. Its combination of precise timing, advanced circuitry, and robust safety mechanisms ensures reliable performance across a variety of applications. By addressing both user convenience and operational risks, the apparatus sets a new benchmark for modern power tools, emphasizing the importance of safety, efficiency, and versatility in design.

The startup control circuit also demonstrates an innovative approach to integrating energy efficiency with functional design. By utilizing a DC conversion circuit to regulate power delivery, the system minimizes energy waste while ensuring stable performance for the tool. This is particularly advantageous for battery-powered devices, where efficient energy use directly impacts runtime and user productivity. For example, a grass trimmer or chainsaw equipped with this apparatus can operate longer on a single charge, maximizing utility without compromising performance.

The apparatus's reliance on voltage waveforms to control operations also enhances its responsiveness to user input. These waveforms serve as precise signals that dictate the tool's state, ensuring that it transitions seamlessly from standby to active mode. This design not only enhances user experience but also prevents unnecessary strain on the tool's components, reducing wear over time. For instance, tools like reciprocating saws, which often undergo repetitive startups, benefit significantly from this level of control.

A notable feature of the apparatus is its incorporation of relays as a fail-safe mechanism. Relays provide an additional layer of control by acting as intermediaries between the power source and the tool's drive unit. Their ability to open or close circuits based on specific conditions ensures that the tool remains inactive unless all safety parameters are met. This is particularly critical for tools used in construction or landscaping, where accidental activation could lead to severe injuries.

The inclusion of an emergency warning circuit highlights the apparatus's commitment to proactive safety measures. By monitoring the battery pack for irregularities such as overheating or voltage fluctuations, the circuit can take immediate corrective actions. These include disconnecting the power source or sending alerts to the user. In more advanced configurations, the system can even deploy physical safeguards, such as covering the battery pack to contain potential hazards. These features make the apparatus particularly valuable in professional settings, where safety is a top priority.

Biometric authentication further reinforces the apparatus's focus on secure operation. By requiring users to verify their identity before accessing critical controls, the system reduces the likelihood of unauthorized or accidental tool activation. This feature is especially useful in environments where tools are shared among multiple users or stored in areas accessible to non-professionals, such as home workshops or public facilities.

The apparatus's compatibility with advanced user devices underscores its adaptability to modern technological ecosystems. Through wireless communication, such as Bluetooth or Wi-Fi, users can monitor tool performance, receive alerts, and issue commands remotely. This integration not only enhances convenience but also provides real-time insights into tool operation, enabling users to respond quickly to potential issues.

Finally, the apparatus's robust construction and thoughtful integration of components ensure that it meets the demands of both casual and professional users. Its ability to adapt to different tools and environments, combined with its emphasis on safety and efficiency, positions it as a cornerstone of next-generation power tool technology. By balancing innovation with practicality, the startup control circuit sets a new standard for the industry, paving the way for more secure and user-friendly tools in the future.

The startup control circuit also addresses the challenge of balancing advanced features with ease of use. Despite its sophisticated components and operations, the apparatus is designed to be intuitive for users of varying skill levels. For instance, the use of clear voltage waveforms as control signals simplifies the startup process for power tools, ensuring that even inexperienced users can operate the tools safely and effectively. This accessibility broadens the appeal of the apparatus, making it suitable for both professional tradespeople and DIY enthusiasts.

In addition to user-friendly operation, the apparatus minimizes the risk of operational errors by automating critical safety checks. For example, the sequential timing of current paths ensures that the tool only activates under the correct conditions, reducing the likelihood of accidental startups. Such automation alleviates the burden on users to manually verify safety protocols, making the tools safer and more reliable in everyday applications.

The apparatus also reflects a forward-thinking approach to energy management, particularly in the context of battery-powered tools. By optimizing the interaction between the battery pack, DC conversion circuit, and switch circuits, the system ensures that power is utilized efficiently without unnecessary drain. This is especially important for cordless tools, where prolonged battery life is a key factor in usability and convenience. Tools equipped with this apparatus are better suited to extended tasks, such as trimming large hedges or cutting dense materials.

From a maintenance perspective, the modular design of the apparatus facilitates easier repairs and upgrades. Individual components like the DC conversion circuit, protection diodes, and relay can be serviced or replaced without disrupting the entire system. This modularity not only reduces downtime for professional users but also lowers the long-term cost of ownership, making the apparatus an economical choice for a wide range of applications.

The startup control circuit also highlights the potential for future innovation in power tools. Its integration of biometric authentication, remote monitoring, and emergency response features lays the groundwork for even more advanced functionalities. For example, future iterations could incorporate AI-based diagnostics to predict potential issues or enhance the responsiveness of the control system. Such advancements would further improve the safety, efficiency, and adaptability of power tools in an ever-evolving technological landscape.

In conclusion, the startup control circuit represents a significant leap forward in the design and operation of power tools. Its combination of precision control, robust safety mechanisms, and user-centric features sets a new benchmark for the industry. By addressing the needs of diverse users and applications, the apparatus not only enhances the functionality of individual tools but also redefines the standards of safety and efficiency in the power tool market. With its focus on innovation and practicality, the apparatus is poised to remain a cornerstone of modern power tool technology for years to come.

The startup control circuit also embodies a holistic approach to tool safety, incorporating both preventive and reactive safety mechanisms. The preventive measures, such as voltage regulation and precise current timing, ensure that potential hazards are mitigated before they occur. At the same time, reactive features like the emergency warning circuit and physical battery shielding provide an added layer of protection against unforeseen issues. This dual approach highlights the apparatus's comprehensive safety strategy, making it a standout innovation in the power tool industry.

Its design further prioritizes environmental sustainability through efficient power usage and long-lasting components. By optimizing the performance of the DC conversion circuit and reducing unnecessary power consumption, the apparatus not only enhances tool efficiency but also minimizes its environmental footprint. This aligns with the growing demand for eco-friendly solutions in modern technology, ensuring that tools equipped with the apparatus are both high-performing and environmentally responsible.

Additionally, the apparatus sets the stage for the integration of smart technologies into power tools. Features like biometric authentication and wireless connectivity illustrate the potential for tools to become part of the broader Internet of Things (IoT) ecosystem. This connectivity enables users to monitor, control, and troubleshoot their tools remotely, further enhancing their convenience and functionality. For example, a user could receive notifications about battery health or operational status on their smartphone, allowing for timely maintenance and extended tool life.

The adaptability of the startup control circuit to a wide range of tools and tasks also underscores its versatility. Whether used in residential settings for gardening tools or in industrial environments for heavy-duty equipment, the apparatus provides consistent safety and performance enhancements. This universality reduces the need for tool-specific solutions, simplifying the user experience and promoting the apparatus as a cost-effective investment for various applications.

Finally, the startup control circuit stands as a testament to the potential of merging advanced engineering with practical design. By addressing both the technical and user-oriented aspects of power tool operation, it achieves a balance that is rare in the industry. Its innovative features not only improve the safety and efficiency of power tools but also pave the way for future advancements, ensuring its relevance in an increasingly technology-driven world. In every sense, the apparatus is a cornerstone of modern tool innovation, setting a high standard for what power tools can achieve.

In view of the drawbacks of the prior art mentioned above, the purpose of the disclosure is to provide a startup control circuit, a power tool, and a power tool startup control method that can prevent accidental activation of the action part when the battery pack is inserted improperly, thereby improving the safety of the power tool.

To achieve the above purpose and other related purposes, the disclosure provides a startup control circuit for a power tool, wherein the startup control circuit comprises:

a first switch circuit, a DC conversion circuit, a main control unit, and a second switch circuit;

The first switch circuit is connected to a battery pack and the DC conversion circuit, wherein when the first switch circuit is triggered, the first switch circuit activates the DC conversion circuit to supply power to the second switch circuit and the main control unit;

The second switch circuit is connected to the battery pack, the DC conversion circuit, and the main control unit, wherein based on different timing sequences of currents flowing from the battery pack and the DC conversion circuit reaching the second switch circuit, the second switch circuit outputs different voltage waveforms;

The main control unit is configured to output a first drive command when receiving a first voltage waveform, wherein the first voltage waveform is a voltage waveform outputted by the second switch circuit when the second switch circuit first receives a current flowing from the DC conversion circuit.

In an optional embodiment of the disclosure, the main control unit is further configured to output a second drive command when receiving a second voltage waveform, wherein the second voltage waveform is a voltage waveform outputted by the second switch circuit when the second switch circuit simultaneously receives currents flowing from the battery pack and the DC conversion circuit.

In an optional embodiment of the disclosure, the first voltage waveform is a voltage waveform that changes from low to high, wherein the second voltage waveform is a voltage waveform that changes from high to flat.

In an optional embodiment of the disclosure, the first switch circuit comprises a startup switch, a first resistor, a second resistor, and a control switch, wherein the first resistor and the second resistor form a voltage dividing circuit;

The startup switch has a first terminal connected to a positive terminal of the battery pack, and a second terminal connected to ground through the voltage dividing circuit;

The control switch has a control terminal connected to the voltage dividing circuit and the main control unit, an input terminal connected to a negative input terminal of the DC conversion circuit, and an output terminal connected to ground;

When the startup switch is closed and the battery pack is inserted, the control switch is closed, and the DC conversion circuit works.

In an optional embodiment of the disclosure, the first switch circuit further comprises a voltage regulator tube, wherein the voltage regulator tube is connected between the startup switch and the voltage dividing circuit.

In an optional embodiment of the disclosure, the startup control circuit further comprises a first protection diode, wherein an anode of the first protection diode is connected to a positive terminal of the battery pack, and a cathode of the first protection diode is connected to the DC conversion circuit, the first switch circuit, and the second switch circuit.

In an optional embodiment of the disclosure, the second switch circuit comprises a first capacitor and an optocoupler, wherein a first terminal of the first capacitor is configured to receive current from the battery pack, and a second terminal of the first capacitor is connected to a first terminal of the optocoupler, wherein when a time of current flowing from the battery pack reaching the first terminal of the first capacitor is same as a time of current flowing from the DC conversion circuit reaching a second terminal of the optocoupler, the second switch circuit outputs the first voltage waveform;

When the time of current flowing from the battery pack reaching the first terminal of the first capacitor is earlier than the time of current flowing from the DC conversion circuit reaching the second terminal of the optocoupler, the second switch circuit outputs a second voltage waveform.

In an optional embodiment of the disclosure, the second switch circuit further comprises a second protection diode, wherein the second protection diode is connected to the first terminal of the optocoupler.

In an optional embodiment of the disclosure, the startup control circuit further comprises a relay, wherein the relay is connected in series between the positive terminal of the battery pack and the drive unit, wherein a coil of the relay is powered by the DC conversion circuit.

In an optional embodiment of the disclosure, the startup control circuit further comprises a second capacitor, wherein a first terminal of the second capacitor is connected to the relay and the drive unit, and a second terminal of the second capacitor is connected to ground.

To achieve the above purpose and other related purposes, the disclosure also provides a power tool, wherein the power tool comprises:

an action part;

a battery pack, wherein the battery pack supplies power to the action part;

a startup control circuit, comprising:

a first switch circuit, a DC conversion circuit, a main control unit, a second switch circuit, and a drive unit;

The first switch circuit is connected to the battery pack and the DC conversion circuit, wherein when the first switch circuit is triggered, the first switch circuit activates the DC conversion circuit to supply power to the second switch circuit, the main control unit, and the drive unit;

The second switch circuit is connected to the battery pack and the main control unit, wherein based on different timing sequences of the first switch circuit being triggered, the second switch circuit outputs different voltage waveforms;

The main control unit is configured to output a first drive command to the drive unit when receiving a first voltage waveform, wherein the first voltage waveform is a voltage waveform outputted by the second switch circuit when the second switch circuit first receives a current flowing from the DC conversion circuit;

The drive unit controls the action part to not work based on the first drive command.

In an optional embodiment of the disclosure, the main control unit is further configured to output a second drive command when receiving a second voltage waveform, wherein the second voltage waveform is a voltage waveform outputted by the second switch circuit when the second switch circuit simultaneously receives currents flowing from the battery pack and the DC conversion circuit;

The drive unit controls the action part to work based on the second drive command.

In an optional embodiment of the disclosure, the power tool comprises a chain saw, a pruner, a grass trimmer, or a reciprocating saw.

To achieve the above purpose and other related purposes, the disclosure also provides a power tool startup control method, comprising:

when a battery pack is connected to a power tool, a current flows from the battery pack;

when the current reaches a first terminal of a second switch circuit through a first path first and reaches a second terminal of the second switch circuit through a second path later, the second switch circuit outputs a first voltage waveform, and a main control unit outputs a first drive command based on detecting the first voltage waveform;

when a time of the current reaching the first terminal of the second switch circuit through the first path is same as a time of the current reaching the second terminal of the second switch circuit through the second path, the second switch circuit outputs a second voltage waveform, and the main control unit outputs a second drive command based on detecting the second voltage waveform.

In an optional embodiment of the disclosure, the first path is a path through which the current flows from a positive terminal of the battery pack to the first terminal of the second switch circuit.

In an optional embodiment of the disclosure, the second path is a path through which the current flows from the positive terminal of the battery pack through a DC conversion circuit to reach the second terminal of the second switch circuit.

In an optional embodiment of the disclosure, when a first switch circuit is triggered and the battery pack is connected to the power tool, the current flows from the positive terminal of the battery pack through the DC conversion circuit to reach the second terminal of the second switch circuit.

The disclosure relates to the technical field of power tools, specifically to a startup control circuit, a power tool, and a power tool startup control method. The startup control circuit comprises a first switch circuit, a DC conversion circuit, a main control unit, and a second switch circuit. When a user performs an improper operation by first pressing the startup switch and then inserting the battery pack, the startup control circuit outputs a first drive command to the drive unit of the power tool to prevent the action part of the power tool from working. This not only ensures reliable operation of the power tool but also ensures operator safety, improving the safety performance of the power tool and increasing user satisfaction.

DETAILED DESCRIPTION

Among high-end garden machinery products, a chain saw is commonly seen mechanical equipment in landscaping and gardening, and is an essential tool in the logging industry. A good chain saw can make the entire work process smoother and greatly improve efficiency. As one of the power tools with the widest application range and highest usage frequency among garden machinery products, especially lithium battery brushless chain saws, it mainly consists of four parts: a motor providing power, a battery pack providing energy, a circuit board for drive control, and a saw chain for executing actions.

The saw chain portion consists of the following multiple components: a chain brake, also known as a brake, which is a device for quickly stopping chain rotation; a saw chain gear, also known as a chain wheel, which is a toothed component for driving the saw chain; a front handle installed at the front of the chain saw; a front handle guard also known as a safety guard; a guide bar also known as a chain bar, whose sturdy track structure supports and guides the saw chain; and a rear handle installed at the back of the chain saw, which serves as the main handle.

All of these components belong to the safety function components of the saw chain portion. Although so many safety function components have been designed, there remains a startup hazard in existing chain saw products: if operators do not follow normal operating procedures, the chain saw may cause personal injury and property damage due to sudden rotation or unexpected situations, which is rather dangerous and unpredictable for both operators and the surrounding environment. Therefore, it is necessary to continuously optimize and improve the protection functions of power tools.

Based on this purpose, this disclosure provides a startup control circuit applied to electric chain saws, used to solve the safety hazard brought by unexpected operation of the motor as the action part when improperly operating by first pressing the startup switch and then inserting the battery pack. Of course, the startup control circuit of the disclosure can also be applied to other power tools with similar safety hazards, such as pruners, grass trimmers, reciprocating saws, electric drills, electric hammers, electric polishers, electric scissors, and other power tools.

Figure 1:
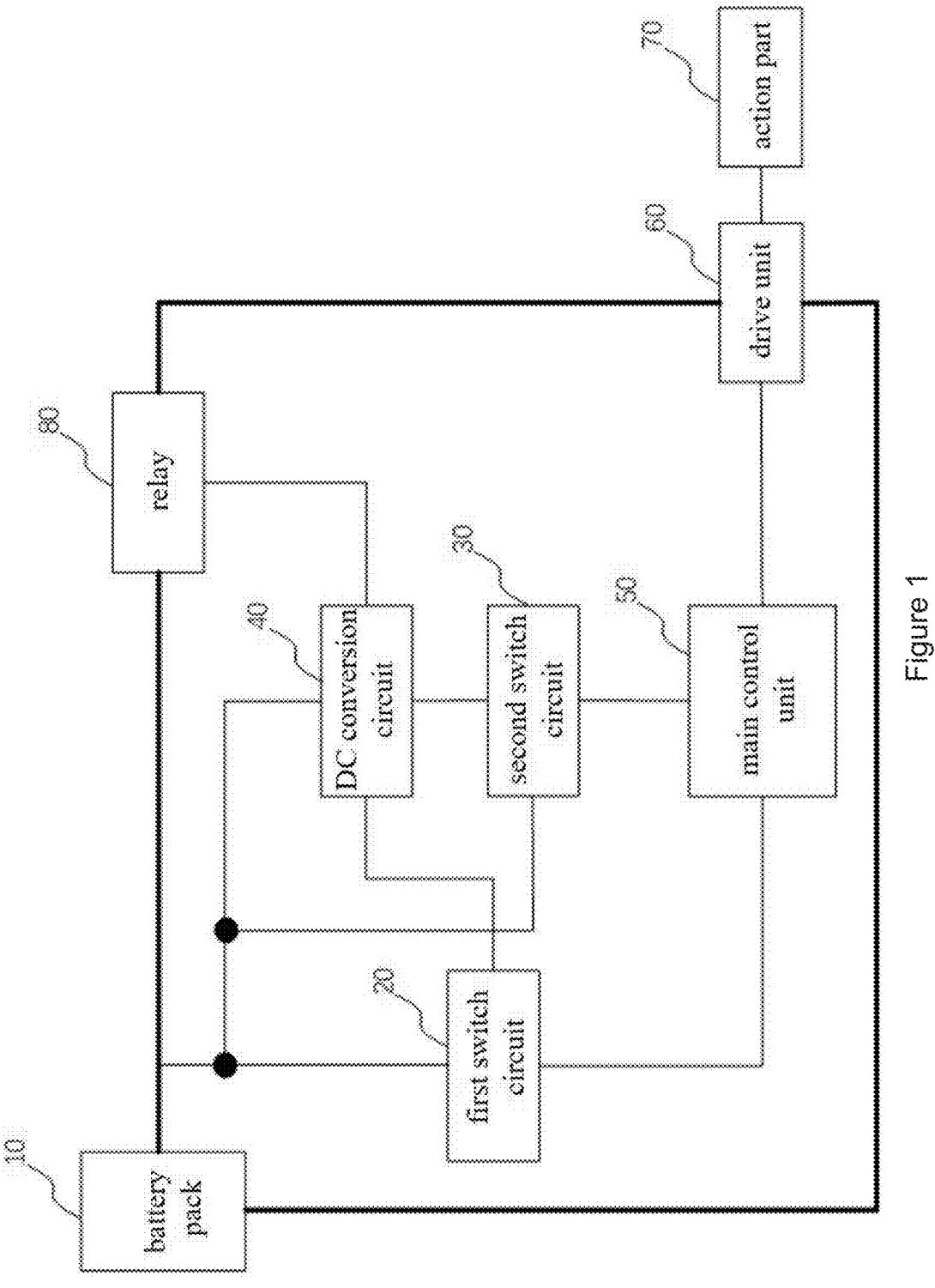
FIG. 1 illustrates the circuit schematic of the startup control circuit in the disclosure.
Figure 2:
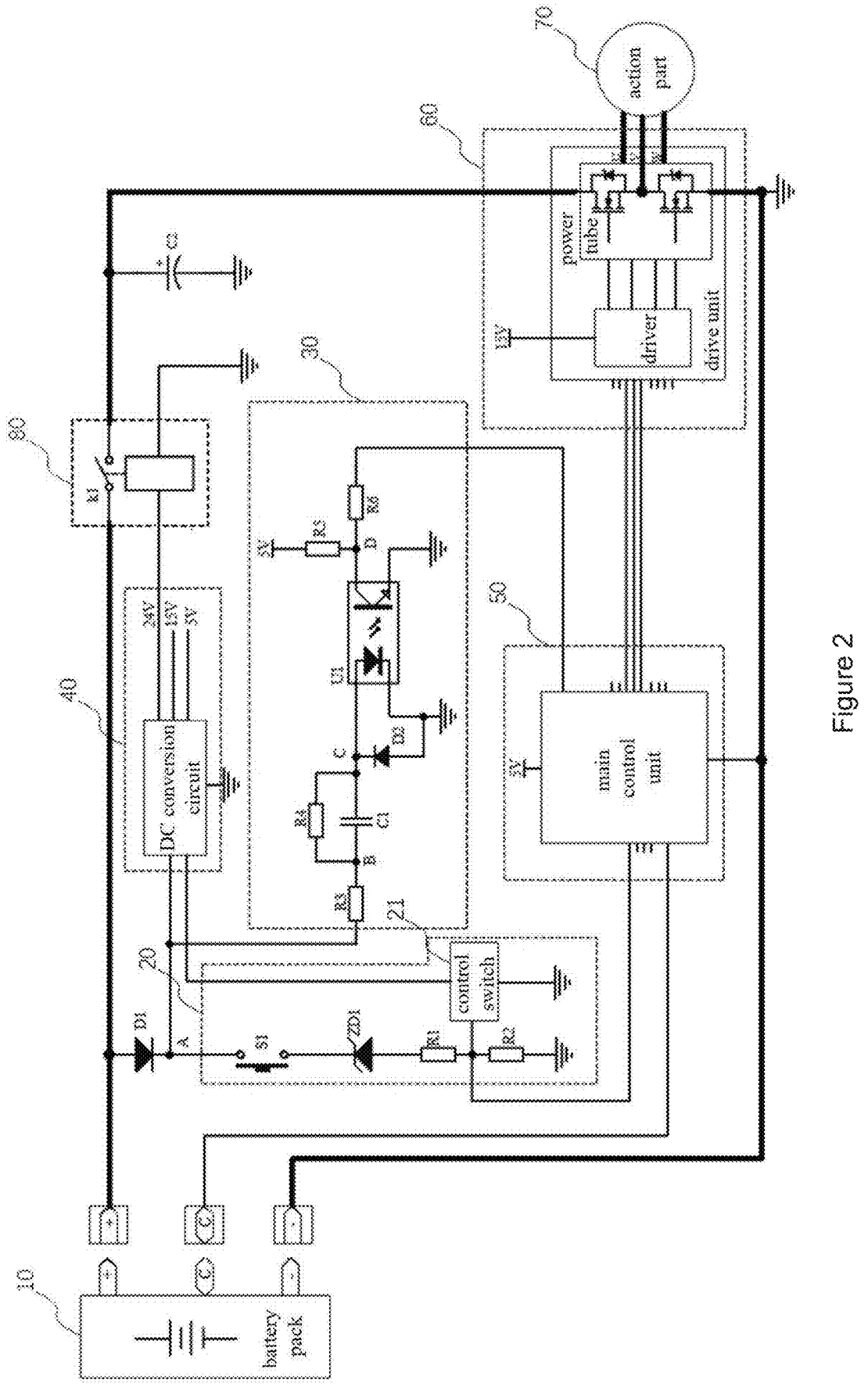
FIG. 2 illustrates the circuit diagram of the startup control circuit in a specific embodiment of the disclosure.

As shown in FIG. 1 and FIG. 2, the disclosure discloses a startup control circuit for a power tool. The power tool includes a battery pack 10, an action part 70 powered by the battery pack 10, and a startup control circuit including a startup switch S1, wherein the startup switch S1 can be a trigger switch, push button switch, touch switch, etc. In this embodiment, the action part 70 includes but is not limited to a motor. The startup control circuit includes a first switch circuit 20, a DC conversion circuit 40, a main control unit 50, a second switch circuit 30, and a drive unit 60.

As shown in FIG. 1 and FIG. 2, the first switch circuit 20 is connected to the battery pack 10 and the DC conversion circuit 40, wherein when the first switch circuit is triggered, it activates the DC Conversion circuit 40 to work to supply power to the second switch circuit 30, the main control unit 50, and the drive unit 60, wherein the triggering condition of the first switch circuit 20 is that the startup switch S1 is closed and the battery pack 60 is inserted into the power tool and reliably connected with the power tool.

As shown in FIG. 2, the first switch circuit 20 includes a startup switch S1, a voltage dividing circuit, and a control switch 21; one terminal of the startup switch S1 is connected to the positive terminal of the battery pack 10, and another terminal is connected to ground through the voltage dividing circuit; a control terminal of the control switch 21 is connected to the voltage dividing circuit and the main control unit 50, an input terminal is connected to a negative input terminal of the DC conversion circuit 40, and an output terminal is connected to ground, while a positive input terminal of the DC conversion circuit 40 is connected to the positive terminal of the battery pack 10 through a first protection diode D1; when the startup switch S1 is closed and the battery pack 10 is inserted, the battery pack 10 supplies power to the voltage dividing circuit, the control switch 21 is closed, and the DC conversion circuit 40 starts working and outputs supply voltage, wherein the control switch 21 can be a transistor or a MOS transistor.

As shown in FIG. 2, the first switch circuit 20 also includes a voltage regulator tube ZD1, wherein the voltage regulator tube ZD1 is connected between the startup switch S1 and the voltage dividing circuit, and the voltage regulator tube ZD1 is used to stably transmit the voltage flowing from the positive terminal of the battery pack 10 to the voltage dividing circuit. The voltage dividing circuit includes a first resistor R1 and a second resistor R2, wherein one terminal of the first resistor R1 is connected to the positive terminal of the battery pack 10 through the voltage regulator tube ZD1, startup switch S1, and first protection diode D1 in sequence, and another terminal is connected to ground through the second resistor R2, and the control terminal of the control switch 21 is connected at the connection point between the first resistor R1 and the second resistor R2.

When the startup switch S1 is pressed, that is, when the startup switch S1 is closed, and when the battery pack 10 is inserted, the first switch circuit 20 is activated. The positive voltage from the battery pack 10 is divided through the first protection diode D1, startup switch S1, voltage regulator tube ZD1, and the voltage dividing circuit formed by the first resistor R1 and second resistor R2, driving the control switch 21 to conduct, thereby connecting the negative input terminal of the DC conversion circuit 40 to ground. This makes the DC conversion circuit 40 work, converting the positive voltage of the battery pack 10 to the required voltage for the electrical components of the startup control circuit to supply power, enabling normal operation of the main control unit 50, the second switch circuit 30, the drive unit 60, a coil of a relay 80, and other electrical components. When the main control unit 50 starts working, the control switch 21 receives its driving voltage from the main control unit 50, and at this time, opening the startup switch S1 does not affect the operation of the entire power tool. The supply voltage output by the DC conversion circuit 40 can be set according to the voltage required by each electrical component.

As an example, the DC conversion circuit 40 can be a DC-DC circuit that can output supply voltages such as 24V, 15V, 5V, etc., wherein the 5V supply voltage is used to power the main control unit 50, the 15V supply voltage is used to power the drive unit 60, and the 24V supply voltage is used to power the coil of the relay 80 to close the relay 80 and connect the power supply circuit between the battery pack 10 and the drive unit 60.

As shown in FIG. 1 and FIG. 2, the second switch circuit 30 is connected to the battery pack 10, DC conversion circuit 40, and main control unit 50 respectively. Based on different timing sequences of currents flowing from the battery pack 10 and the DC conversion circuit 40 reaching the second switch circuit 30, the second switch circuit 30 outputs different voltage waveforms. Specifically, when the second switch circuit 30 first receives current flowing from the DC conversion circuit 40, it outputs a first voltage waveform, and when the second switch circuit 30 simultaneously receives currents flowing from the battery pack 10 and the DC conversion circuit 40, it outputs a second voltage waveform. It should be noted that in this embodiment, simultaneous current arrival means basically the same timing without considering the self-opening delay of circuit components and current transmission delay.

The second switch circuit 30 includes a first capacitor C1 and an optocoupler U1. One terminal of the first capacitor C1 is connected to the positive terminal of the battery pack 10 to directly receive current from the battery pack 10 for charging, and another terminal of the first capacitor C1 is connected to one terminal of the optocoupler U1. Using the basic characteristics of the first capacitor C1—passing AC, blocking DC, passing high frequency, and blocking low frequency—the first capacitor C1 is connected in series between the front and back stages of the circuit as a coupling capacitor. This achieves the purpose of blocking DC bias signals and coupling high-frequency signals. After coupling, the voltage signal can be applied at point C to make the LED inside the optocoupler U1 conduct and work. When the DC conversion circuit 40 supplies power to the fifth resistor R5, it makes the phototransistor inside the optocoupler U1 conduct and work, causing the voltage waveform at point D to output different voltage waveforms according to the corresponding operation mode.

Specifically, the second switch circuit 30 can use the output of the battery pack 10 to charge the first capacitor C1, and control the on-off state of the optocoupler U1 to output different voltage waveforms to the main control unit 50 based on different timing sequences of inserting the battery pack 10 and pressing the startup switch S1. When the startup switch S1 is pressed first and the battery pack 10 is inserted later, the time when current flowing from the battery pack 10 reaches one terminal of the first capacitor C1 will be earlier than the time when current flowing from the DC conversion circuit 40 reaches another terminal of the optocoupler U1 (the terminal connected to resistor R5), and the second switch circuit 30 outputs a "low-then-high" first voltage waveform. When the battery pack 10 is inserted first and the startup switch S1 is pressed later, without considering the self-opening delay of circuit components and current transmission delay, when the time of current flowing from the battery pack 10 reaching one terminal of the first capacitor C1 is basically the same as the time of current flowing from the DC conversion circuit 40 reaching another terminal of the optocoupler U1 (the terminal connected to resistor R5), the second switch circuit 30 outputs a "high-then-flat" second voltage waveform.

As shown in FIG. 2, in a specific embodiment, besides the first capacitor C1 and optocoupler U1, the second switch circuit 30 also includes a third resistor R3, a fourth resistor R4, a fifth resistor R5, and a sixth resistor R6. The optocoupler U1 includes an LED and a phototransistor. One terminal of the third resistor R3 is connected to the positive terminal of the battery pack 10 through the first protection diode D1, and another terminal is connected to one terminal of the first capacitor C1. The fourth resistor R4 is connected in parallel with the first capacitor C1 for capacitor discharge. Another terminal of the first capacitor C1 is connected to ground through the LED of the optocoupler U1. The output terminal of the optocoupler U1 is connected to one terminal of the fifth resistor R5 and one terminal of the sixth resistor R6 respectively. Another terminal of the fifth resistor R5 is connected to the output terminal of the DC conversion circuit 40, and another terminal of the sixth resistor R6 is connected to the I/O port of the main control unit 50.

As shown in FIG. 2, in a specific embodiment, the second switch circuit 30 also includes a second protection diode D2. The anode of the second protection diode D2 is connected to ground, and the cathode is connected to the terminal of the first capacitor C1 that is not connected to the third resistor R3. The second protection diode D2 is used to absorb stray waves for protection.

It should be noted that both the "high-then-flat" voltage waveform and the "low-then-high" voltage waveform are detected within a specific time period when the power tool starts up. In this embodiment, after the main control unit 50 is powered on, it can detect the voltage value at point D at a first selected time point (for example, 10 ms) and a second selected time point (for example, 300 ms), and then determine whether the current voltage waveform is "high-first" or "low-first" based on these two voltage values. These two time points need to be selected according to the circuit parameters and voltage waveforms under different operation modes within a period after the main control unit 50 is powered on, to distinguish between these two different operation mode voltage waveforms.

Specifically, when the startup switch S1 is pressed first and the battery pack 10 is inserted later, the second switch circuit 30 outputs a "low-then-high" first voltage waveform. When the main control unit 50 receives the first voltage waveform, it outputs a first drive command to the drive unit 60, and the drive unit 60 controls the action part 70 not to work based on the first drive command. When the battery pack 10 is inserted first and the startup switch S1 is pressed later, the second switch circuit 30 outputs a "high-then-flat" second voltage waveform. When the main control unit 50 receives the second voltage waveform, it outputs a second drive command to the drive unit 60, and the drive unit 60 controls the action part 70 to work based on the second drive command. This method not only ensures reliable operation of the power tool but also ensures operator safety, improving the safety performance of the power tool and increasing user satisfaction.

As shown in FIG. 2, the startup control circuit also includes a relay 80. The relay 80 is connected in series between the positive terminal of the battery pack 10 and the drive unit 60, used to control the connection and disconnection of the power supply circuit between the battery pack 10 and the drive unit 60, wherein the coil of the relay 80 is powered by the DC conversion circuit 40.

As shown in FIG. 2, the startup control circuit also includes a second capacitor C2. One terminal of the second capacitor C2 is connected to the relay 80 and the drive unit 60, and another terminal is connected to ground. The second capacitor C2 not only has energy storage function but also has filtering function, used to provide sufficiently stable and noise-free power to the drive unit 60 to drive the action part 70 to work.

Typically, the power tool has two operation modes. The first operation mode is to insert the battery pack 10 first and then press the startup switch S1, which can be called normal operation mode. In normal operation mode, using the startup control circuit can output the first drive command to the drive unit 60, enabling the drive unit 60 to drive the motor as the action part 70 to run normally. The second operation mode is to press the startup switch S1 first and then insert the battery pack 10, which can be called improper operation mode (also known as incorrect operation mode or abnormal operation mode). In improper operation mode, using the startup control circuit can output the second drive command to the drive unit 60, causing the drive unit 60 to control the motor as the action part 70 not to work.

The following will explain the working principle of the startup control circuit in both normal operation mode and abnormal operation mode.

Figure 3:
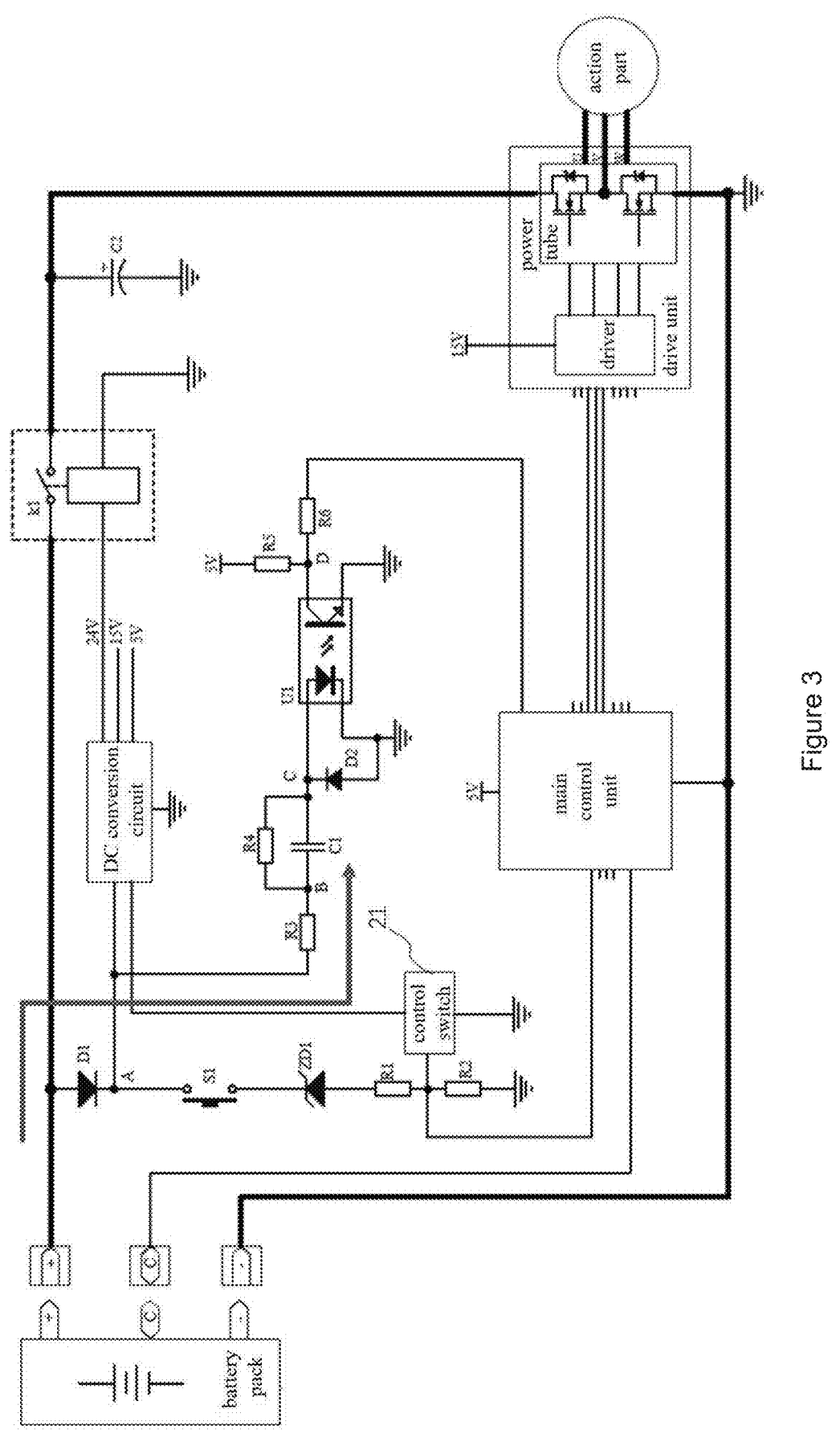
FIG. 3 illustrates a schematic diagram of one working state of the startup control circuit in a specific embodiment of the disclosure during normal operation.
Figure 4:
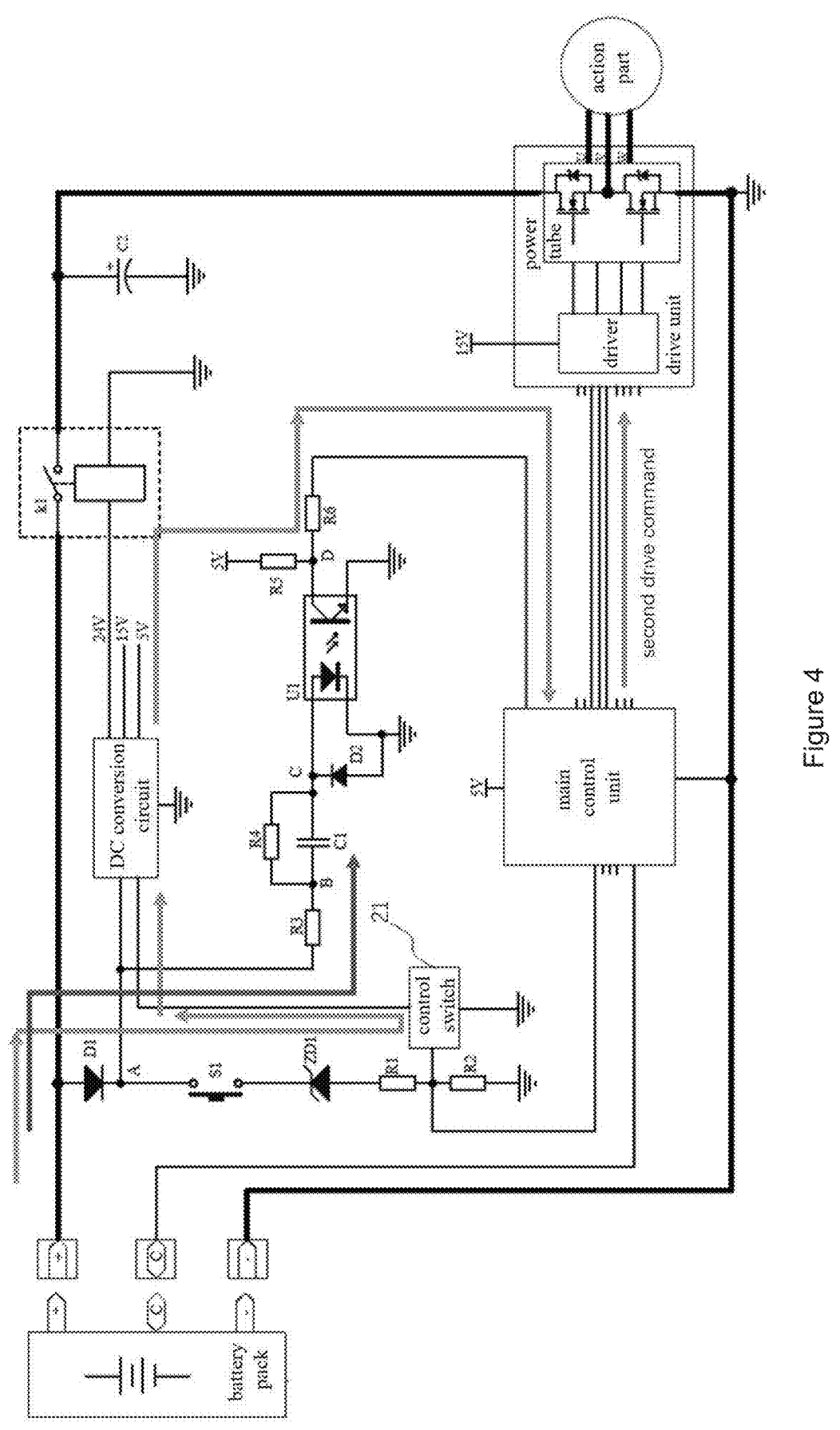
FIG. 4 illustrates a schematic diagram of another working state of the startup control circuit in a specific embodiment of the disclosure during normal operation.

As shown in FIG. 3 and FIG. 4, in normal operation mode, when the battery pack 10 is inserted first, there are two working states in the startup control circuit. One working state is as shown in FIG. 3: before pressing the startup switch S1, the circuit has already formed a loop with the positive voltage provided by the positive terminal of the battery pack

10 through the first protection diode D1, third resistor R3, and the LED inside the optocoupler U1, pre-charging the first capacitor C1, and the first capacitor C1 is in a fully charged state. The other working state is as shown in FIG. 4: after pressing the startup switch S1, the positive voltage provided by the positive terminal of the battery pack 10 is divided through the first protection diode D1, startup switch S1, voltage regulator tube ZD1, and the voltage dividing circuit formed by the first resistor R1 and second resistor R2, driving the control switch 21 to conduct, making the DC conversion circuit 40 work to generate 5V and other voltages to power the main control unit 50 and the fifth resistor R5, causing the optocoupler U1 to conduct and work, forming a "high-then-flat" second voltage waveform at point D which is then current-limited through the sixth resistor R6 to the I/O port of the main control unit 50. When the main control unit 50 receives such a voltage waveform, since the program pre-stored in the main control unit 50 defines such a "high-then-flat" voltage waveform as an enabling signal, the main control unit 50 can control the drive unit 60's output as a drive signal, driving the motor as the action part 70 to run normally.

Figure 5:
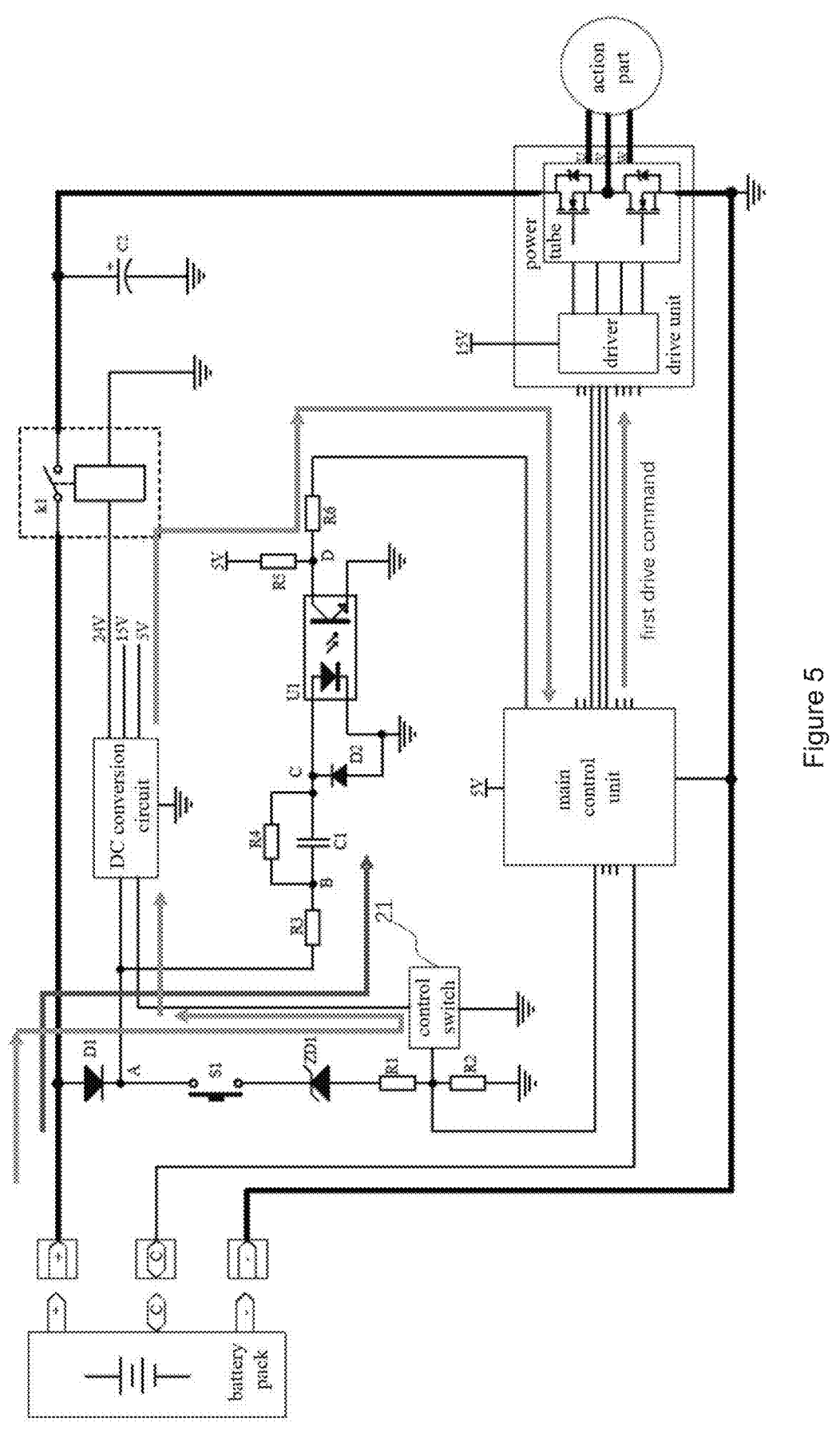
FIG. 5 illustrates a schematic diagram of the startup control circuit in a specific embodiment of the disclosure, showing two paths working simultaneously during improper operation.

As shown in FIG. 5, in improper operation mode, that is, when pressing the startup switch S1 first and then inserting the battery pack 10, there are two simultaneous working paths in the startup control circuit. One path is where the positive voltage provided by the positive terminal of the battery pack 10 is divided through the first protection diode D1, startup switch S1, voltage regulator tube ZD1, and the voltage dividing circuit formed by the first resistor R1 and second resistor R2, driving the control switch 21 to conduct, making the DC conversion circuit 40 work to generate 5V and other voltages to power the main control unit 50, fifth resistor R5, and other components. The other path is where the positive voltage from the battery pack 10 forms a loop through the first protection diode D1, third resistor R3, and the LED inside the optocoupler U1 to charge the first capacitor C1. Since this is the first charging of the first capacitor C1, the voltage in the first capacitor C1 follows a "low-then-high" charging process. As the startup switch S1 is pressed first, it synchronously makes the DC conversion circuit 40 work to generate 5V and other voltages to power the main control unit 50 and the fifth resistor R5, causing the phototransistor inside the optocoupler U1 to conduct, making point D similarly provide a "low-then-high" first voltage waveform through current limitation by the sixth resistor R6 to the I/O port of the main control unit 50. When the main control unit 50 receives such a voltage waveform, since the program pre-stored in the main control unit 50 defines such a "low-then-high" voltage waveform as a shutdown signal, it can control the drive unit 60's output as a shutdown signal, stopping the motor as the action part 70.

Figure 6:
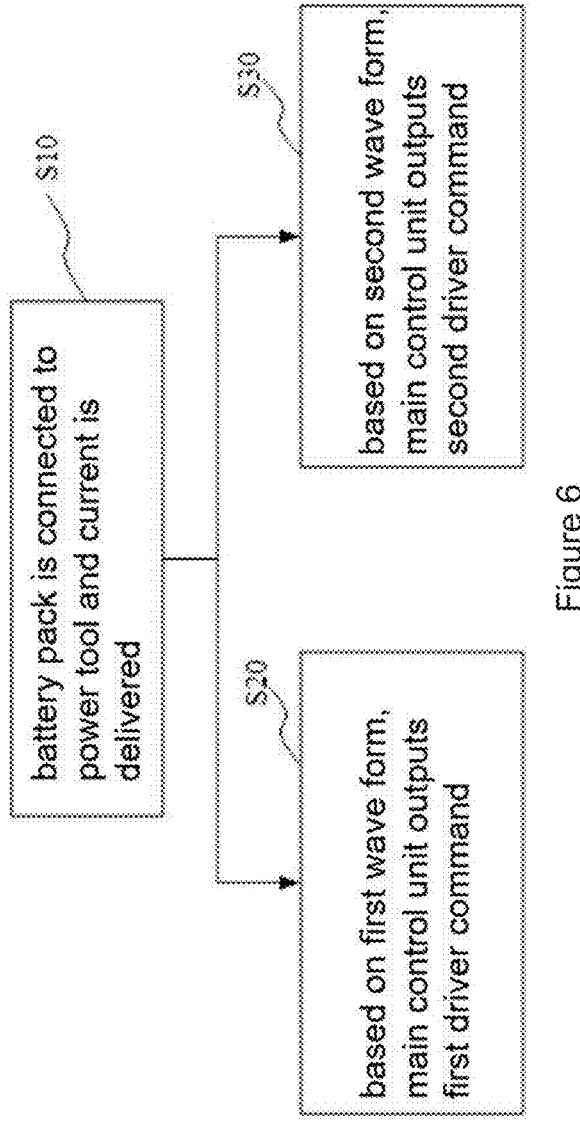
FIG. 6 illustrates a flow diagram of the startup control method for an electric tool in a specific embodiment of the disclosure.

As shown in FIG. 6, this embodiment also discloses a power tool startup control method based on the above startup control circuit, including the following steps:

Step S10: When a battery pack is connected to a power tool, a current flows from the battery pack;

Step S20: When the current reaches a first terminal of the second switch circuit through a first path first and reaches a second terminal of the second switch circuit through a second path later, the second switch circuit outputs a first voltage waveform, and the main control unit outputs a first drive command based on detecting the first voltage waveform;

Step S30: When the time of the current reaching the first terminal of the second switch circuit through the first path is same as the time of the current reaching the second terminal of the second switch circuit through the second path, the second switch circuit outputs a second voltage waveform, and the main control unit outputs a second drive command based on detecting the second voltage waveform.

The first path is the path through which current flows from the positive terminal of the battery pack to one terminal of the second switch circuit. Specifically, this corresponds to the path in FIG. 2 where current flows from the positive terminal of the battery pack 10 through the first protection diode D1 to reach the terminal of the third resistor R3 that is not connected to the first capacitor C1 (point B).

The second path is the path through which current flows from the positive terminal of the battery pack through the DC conversion circuit to reach another terminal of the second switch circuit. Specifically, the second path corresponds to the path in FIG. 2 where current flows from the positive terminal of the battery pack 10 through the first protection diode D1 and DC conversion circuit 40 to output to the terminal of the fifth resistor R5 that is connected to the DC conversion circuit 40. When the first switch circuit 20 is triggered and the battery pack 10 is connected to the power tool, the DC conversion circuit 40 starts working and can supply power, and current flows from the positive terminal of the battery pack 10 through the first protection diode D1 and DC conversion circuit 40 to reach the terminal of the fifth resistor R5 that is connected to the DC conversion circuit 40, supplying power to the fifth resistor R5.

In summary, the disclosure uses a startup control circuit consisting of a first switch circuit, DC conversion circuit, main control unit, second switch circuit, and drive unit to control the action part of the power tool not to work when improperly operated by pressing the startup switch first and then inserting the battery pack. This not only ensures reliable operation of the power tool but also ensures operator safety, improving the safety performance of the power tool and increasing user satisfaction.

The startup control circuit can be implemented with various component values and selections to accommodate different power tool requirements. For a typical 18V-20V battery pack implementation, the voltage dividing circuit can use specific resistor values to achieve appropriate voltage division and timing. The first resistor R1 can be 10 kΩ while R2 can be 4.7 kΩ, providing suitable voltage division for the main control circuit. The discharge control path can use R3 at 1 kΩ and R4 at 100 kΩ, while current limiting can be achieved with R5 at 2.2 kΩ and R6 at 10 kΩ. The timing capacitor C1 typically ranges from 1 μF to 10 μF to achieve the desired timing characteristics, while the filtering capacitor C2 should be larger, typically between 47 μF and 220 μF, to provide stable power filtering.

The selection of active components can significantly affect the performance of the startup control circuit. Common optocouplers such as PC817, TLP521, or 4N35 can be used for the optocoupler U1, providing reliable isolation between the control and power circuits. The voltage regulator tube ZD1 can be selected from the 1N47xx series, with 1N4733A providing a suitable 5.1V regulation for most applications. Protection diodes D1 and D2 should be selected based on the battery pack voltage, with common choices including 1N4001 or FR107 rectifier diodes rated appropriately for the application.

The main control unit 50 can be implemented using various microcontroller options, with consideration for processing speed and peripheral requirements. A suitable microcontroller should include analog-to-digital conversion capabilities for voltage waveform detection, timer peripherals for accurate timing measurement, and sufficient I/O pins for control signals. The firmware implementation should include debounce handling for the startup switch S1, precise timing measurement for waveform detection, and robust error handling for abnormal conditions.

The DC conversion circuit 40 can be designed with multiple output rails to provide the various voltage levels required by different sections of the circuit. A switched-mode power supply implementation can provide higher efficiency compared to linear regulators, particularly important for battery-powered tools. The design should include appropriate filtering and protection mechanisms to ensure stable operation under varying load conditions.

Additional safety features can be incorporated into the startup control circuit design. These may include temperature monitoring of key components, over-current protection for the motor drive circuit, and voltage monitoring of the battery pack. The main control unit 50 can be programmed to respond to these additional safety inputs, providing comprehensive protection for both the tool and operator.

The relay control circuit can be enhanced with additional monitoring capabilities. A secondary feedback circuit can monitor the actual state of the relay contacts, providing verification of proper relay operation. This information can be used by the main control unit 50 to detect relay failures and prevent unsafe operation conditions.

The startup control circuit can be adapted for different types of power tools by modifying the timing parameters and control thresholds. Tools with different power ratings or operating characteristics may require adjusted timing values for the waveform detection points. The firmware in the main control unit 50 can be designed to allow configuration of these parameters without requiring hardware modifications.

Protection against electromagnetic interference (EMI) can be enhanced by careful component placement and PCB layout design. Critical signal paths should be kept short and properly shielded, particularly around the optocoupler and voltage detection circuits. Additional filtering components can be added to improve noise immunity in harsh operating environments.

The startup control circuit can be expanded to include diagnostic and maintenance features. The main control unit 50 can log operational data such as startup attempts, operation time, and fault conditions. This information can be valuable for maintenance purposes and can be accessed through a diagnostic interface added to the circuit.

For mass production considerations, the startup control circuit can be designed with testability in mind. Test points can be added at key circuit nodes to facilitate automated testing during manufacture. The main control unit 50 can include a self-test mode that verifies proper operation of all critical circuit components during power-up or on demand.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A startup control circuit, comprising:
   a direct current (DC) conversion circuit;
   a main control unit;
   a first switch circuit, wherein the first switch circuit is connected to a battery pack, the DC conversion circuit, and the main control unit;
   a second switch circuit, wherein the second switch circuit is connected to the battery pack, the DC conversion circuit, and the main control unit;
   wherein the first switch circuit is configured to activate the DC conversion circuit to supply power to the second switch circuit and the main control unit after the first switch circuit is triggered, wherein the second switch circuit outputs different voltage waveforms based on different timing sequences of currents flowing from the battery pack and the DC conversion circuit to the second switch circuit, wherein the main control unit is configured to output a first drive command when receiving a first voltage waveform, wherein the first voltage waveform is a voltage waveform outputted by the second switch circuit when the second switch circuit first receives a current flowing from the DC conversion circuit.

2. The startup control circuit of claim 1, wherein the main control unit is further configured to output a second drive command when receiving a second voltage waveform, wherein the second voltage waveform is a voltage waveform outputted by the second switch circuit when the second switch circuit simultaneously receives currents flowing from the battery pack and the DC conversion circuit.

3. The startup control circuit of claim 1, wherein the first switch circuit comprises a startup switch, a voltage dividing circuit, and a control switch; wherein a first terminal of the startup switch is connected to a positive terminal of the battery pack, and a second terminal of the startup switch is connected to ground through the voltage dividing circuit; wherein a control terminal of the control switch is connected to the voltage dividing circuit and the main control unit, an input terminal of the control switch is connected to a negative input terminal of the DC conversion circuit, and an output terminal of the control switch is connected to ground; wherein when the startup switch is closed and the battery pack is inserted, the control switch is closed, and the DC conversion circuit starts working.

4. The startup control circuit of claim 3, wherein the first switch circuit further comprises a voltage regulator tube, wherein the voltage regulator tube is connected between the startup switch and the voltage dividing circuit.

5. The startup control circuit of claim 1, further comprising a first protection diode, wherein an anode of the first protection diode is connected to a positive terminal of the battery pack, and a cathode of the first protection diode is connected to the DC conversion circuit, the first switch circuit, and the second switch circuit.

6. The startup control circuit of claim 1, wherein the second switch circuit comprises a first capacitor and an optocoupler, wherein a first terminal of the first capacitor is configured to receive current from the battery pack, wherein a second terminal of the first capacitor is connected to a first terminal of the optocoupler, wherein when a time of current flowing from the battery pack reaching the first terminal of the first capacitor is same as a time of current flowing from the DC conversion circuit reaching a second terminal of the optocoupler, the second switch circuit outputs the first voltage waveform; wherein when the time of current flowing from the battery pack reaching the first terminal of the first capacitor is earlier than the time of current flowing from the DC conversion circuit reaching the second terminal of the optocoupler, the second switch circuit outputs a second voltage waveform.

7. The startup control circuit of claim 6, wherein the first voltage waveform is a voltage waveform that changes from low to high, wherein the second voltage waveform is a voltage waveform that changes from high to flat.

8. The startup control circuit of claim 6, wherein the second switch circuit further comprises a second protection diode, wherein the second protection diode is connected to the first terminal of the optocoupler.

9. The startup control circuit of claim 1, further comprising a relay, wherein the relay is connected in series between the positive terminal of the battery pack and a drive unit, wherein a coil of the relay is powered by the DC conversion circuit.

10. The startup control circuit of claim 1, wherein the main control circuit comprises a battery pack emergency warning circuit, wherein when the main control circuit detects an abnormal temperature of the battery pack, the main control circuit uses a backup battery to send an emergency help message to a user device.

11. The startup control circuit of claim 10, wherein the user device outputs a control command to the main control circuit based on conditions to emergency disconnect an electrical connection of the battery pack.

12. The startup control circuit of claim 11, wherein after receiving the control command, the backup battery is further used to actuate a physical structure to cover the battery pack.

13. The startup control circuit of claim 10, wherein the user device performs a biometric authentication to prevent accidental triggering of the control command.

14. A power tool, comprising:
   an action part;
   a battery pack, wherein the battery pack supplies power to the action part;
   a startup control circuit, comprising a first switch circuit, a DC conversion circuit, a main control unit, a second switch circuit, and a drive unit; wherein the first switch circuit is connected to the battery pack and the DC conversion circuit, wherein the first switch circuit is configured to activate the DC conversion circuit to supply power to the second switch circuit, the main control unit, and the drive unit after the first switch circuit is triggered, wherein the second switch circuit is connected to the battery pack and the main control unit, wherein the second switch circuit outputs different voltage waveforms based on different timing sequences of the first switch circuit being triggered, wherein the main control unit is configured to output a first drive command to the drive unit when receiving a first voltage waveform, wherein the first voltage waveform is a voltage waveform outputted by the second switch circuit when the second switch circuit first receives a current flowing from the DC conversion circuit, wherein the drive unit controls the action part to not work based on the first drive command.

15. The power tool of claim 14, wherein the main control unit is further configured to output a second drive command when receiving a second voltage waveform, wherein the second voltage waveform is a voltage waveform outputted by the second switch circuit when the second switch circuit simultaneously receives currents flowing from the battery pack and the DC conversion circuit, wherein the drive unit controls the action part to work based on the second drive command.

16. The power tool of claim 14, wherein the power tool comprises a chain saw, a pruner, a grass trimmer, or a reciprocating saw.

\* \* \* \* \*